April 30, 1963 B. G. WATTERS ETAL 3,087,570
PANEL AND THE LIKE OF HIGH ACOUSTIC TRANSMISSION LOSS
Filed March 23, 1959 3 Sheets-Sheet 1

INVENTORS
BILL G. WATTERS
GUENTHER KURTZE
BY
Rines and Rines
ATTORNEYS

April 30, 1963  B. G. WATTERS ETAL  3,087,570
PANEL AND THE LIKE OF HIGH ACOUSTIC TRANSMISSION LOSS
Filed March 23, 1959  3 Sheets-Sheet 2
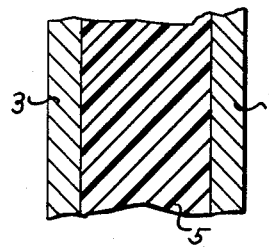
Fig. 2
Fig. 3
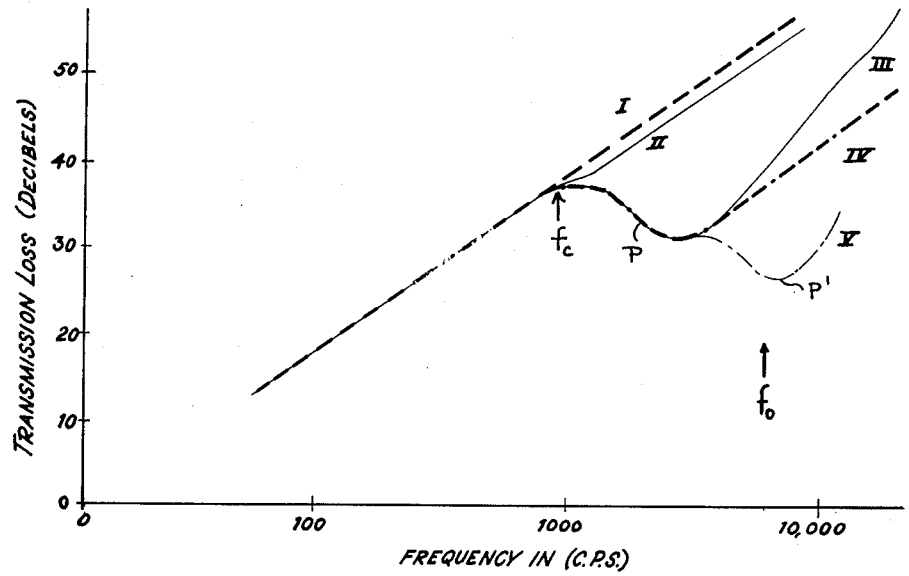
INVENTORS.
BILL G. WATTERS
GUENTHER KURTZE
BY Rines and Rines
ATTORNEYS April 30, 1963   B. G. WATTERS ETAL   3,087,570
PANEL AND THE LIKE OF HIGH ACOUSTIC TRANSMISSION LOSS
Filed March 23, 1959   3 Sheets-Sheet 3
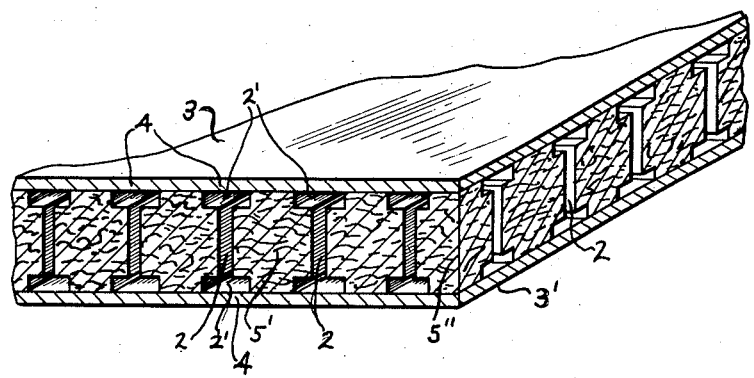
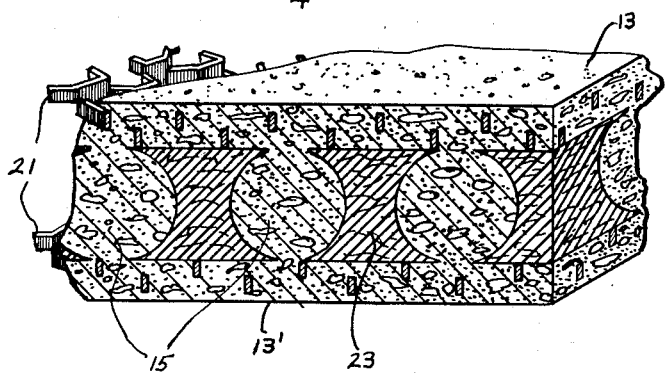
INVENTORS
BILL G. WATTERS
GUENTHER KURTZE
BY Rines and Rines
ATTORNEYS

United States Patent Office 3,087,570
Patented Apr. 30, 1963

3,087,570
PANEL AND THE LIKE OF HIGH ACOUSTIC
TRANSMISSION LOSS
Bill G. Watters, Nahant, and Guenther Kurtze, Arlington,
Mass., assignors to Bolt Beranek and Newman Inc.,
Cambridge, Mass., a corporation of Massachusetts
Filed Mar. 23, 1959, Ser. No. 801,199
16 Claims. (Cl. 181—33)

The present invention relates to walls, partitions and other surfaces, hereinafter generically referred to as panels and the like, and more particularly, to structures for providing a high acoustic transmission loss over a wide band of acoustic frequencies. The terms "acoustic," "sound," and "vibrations," as herein employed, are intended to embrace all kinds of elastic vibrations including audible, sub-audible and super-audible frequencies.

Single and composite panels and the like have heretofore been constructed for the purpose of structurally separating spaces, such as rooms. Such panels, however, radiate acoustic energy, particularly at the higher sound frequencies, as a result of the setting up of transverse waves in the panel of velocity comparable to that of acoustic energy in the air or other medium surrounding the panel. This condition will almost always be found because the velocity of flexural waves increases with the square root of frequency. In the case of composite panels, the transverse wave may result from shear-wave-like motion which will in general always yield a velocity comparable with or in excess of the velocity of acoustic energy in the air space or other medium containing the panels. Under such circumstances, the panels radiate acoustic energy, so that the acoustic transmission loss characteristic at such frequencies is low.

The present invention is directed to a new and improved structure for imbuing such panels and the like with a means for overcoming such deleterious radiation and preventing the shear wave velocity within the inner medium of the panel from becoming comparable with the velocity of acoustic energy in the air or other surrounding medium; preferably confining the same so that the shear-wave velocity in the inner panel medium, as modified by the mass of the panel surfaces or facings, should not be greater than approximately seven tenths of the velocity of sound in the air or other surrounding medium.

A further object is to provide a new and improved panel and the like of high acoustic transmission loss.

Other and further objects will be hereinafter discussed and will be more particularly pointed out in the appended claims.

The invention will now be described in connection with the accompanying drawing FIG. 1 of which is a graph illustrating experimentally obtained performance characteristics of a panel constructed in the preferred form of FIG. 4;

FIG. 2 is a fragmentary longitudinal section of a construction adapted to be dimensioned and adjusted to perform in accordance with the phenomena underlying the present invention;

FIG. 3 is a graph contrasting the performance of panels and the like constructed in accordance with the invention, with prior-art constructions.

FIG. 4 is a fragmentary perspective view of a kerfed-core modification;

FIG. 5 is a view similar to FIG. 4 of a plaster-core modification; and

FIG. 6 is a view similar to FIGS. 4 and 5 of a cavity-provided modification.

Figure 1:
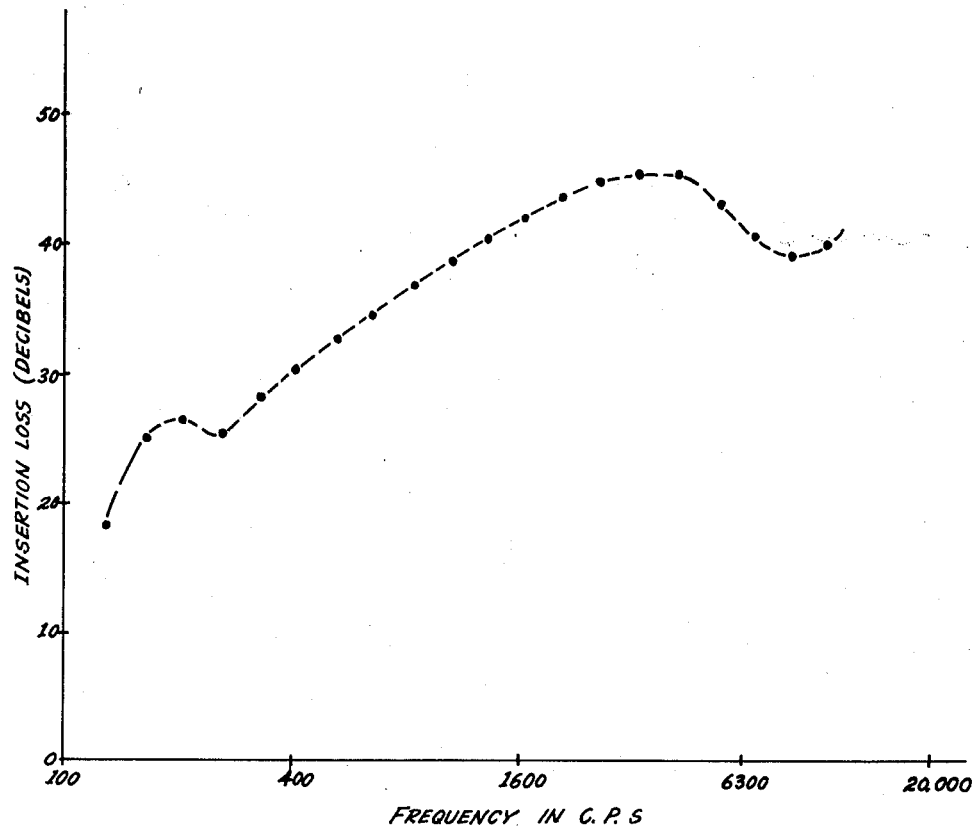

It is well known that a high value of mass per unit area or surface density is required in a wall or the like to provide a high acoustic transmission loss. The role of the bending stiffness of the wall, or equivalently, the velocity of transverse waves therein, however, is fully as important as that of the mass. When the dynamic stiffness of a wall is great enough, or when the velocity of transverse waves is high enough, then the wall tends to lose its massive character and the transmission loss is reduced. Referring, for example, to FIG. 3, where transmission loss is plotted along the ordinate and frequency along the abscissa, the normal rate of increase of transmission loss with frequency (dash-line curve I) becomes interrupted at the critical frequency $f_c$ at which the bending-wave velocity equals or becomes coincident with the velocity of sound in the air or other surrounding medium. The resulting radiation of the wall produces the dip P of the dash-dot curve IV, so that transmission loss is greatly reduced over the important range of from about 900 to 4000 cycles in the example of FIG. 3. The amount of internal damping of the wall material, moreover, generally is of less importance than the mass or stiffness insofar as the transmission loss is concerned.

Other, equally annoying "side effects" also occur in the case of a relatively stiff wall, such as a metal or other panel, which are largely absent in a relatively limp wall of the same weight. For example, structure-borne vibrations transmitted from a distant point (e.g., machinery noise, heel clicks, etc.) will radiate much more efficiently from the stiff structure. This is simply because there is more efficient coupling between structure and the surrounding external air, when the speed of transverse waves in the structure is comparable to or above the speed of sound in air. Similarly, there is more efficient radiation of impact sound from a stiff plate for the same reason.

If a wall may be considered as a purely acoustical device, then, in theory, it is relatively easy to achieve high transmission loss by selecting a material with a high ratio of density (mass per unit area) to Young's modulus, such as lead, steel or glass, in decreasing order of this ratio, so that the speed of transverse waves may be kept low enough for most purposes.

Unfortunately, most walls must serve a structural as well as an acoustical function. In many instances, a mass to stiffness ratio which is high enough for good acoustical performance is altogether too low for good mechanical or structural performance. The acoustical and mechanical requirements, however, are not always unavoidably in conflict. Most mechanical functions may be thought of as existing at zero or at least sub-audio frequencies. For example, a partition should be rigid enough to resist the static force of a person leaning or falling against it; or, in the case of aircraft structures or the like, the structures must be rigid enough to withstand low-frequency aerodynamic pressures. If one could devise a wall with a high static stiffness but low dynamic stiffness in the audible range of frequencies, then both the acoustical and mechanical functions would be efficiently performed.

Sound may be propagated in structures in the form of bending and extensional waves. Essentially, only the bending waves are associated with lateral velocities of sufficient magnitude to interact with the adjacent medium; extensional waves are of importance only insofar as they can be converted into bending waves. The velocity $c_b$ of propagation of bending waves in isotropic plates is given by $$c_b = \sqrt{\omega^4} \sqrt{B/M} \qquad (1)$$

where $\omega$ denotes the angular vibrational frequency, B the bending stiffness, and M the mass per unit area of the wall. Since $c_b$ varies as $\sqrt{\omega}$, one can always find a frequency $f_c$ (FIG. 3) above which the bending wave speed exceeds the speed of sound in air, and interaction becomes efficient. Only for thin, heavy isotropic plates, can this critical frequency be sufficiently high so that interaction is eliminated in the range of interest in most sound-silencing applications.

The velocity $c_s$ of propagation of purely transverse (or shear) waves, which usually are observed only in infinitely extended solids, is given by $$c_s = \sqrt{\mu/\rho}$$

where $\mu$ represents the shear modulus and $\rho$ the density of the material. Shear waves show no dispersion, so that if one could construct plates which favor the propagation of shear rather than bending waves, such plates would have good sound-insulation properties, provided the velocities of propagation of shear waves are appreciably less than the speed of the sound in air or other external medium.

Since it appears impossible to obtain a homogeneous plate simultaneously having large bending stiffness and small shear stiffness, such plates are obviously not the answer to the present problem. Laminated plates, however, of suitably chosen layers may provide the desired combination of stiffness properties. Consider, for example, a panel or the like consisting of a soft but incompressible interior core medium 5 as of rubber or the like, sandwiched between two stiff facing surfaces, plates or skins, as shown at 3 and 3' in FIG. 2. The thin stiff plates or skins 3 and 3' may, for example, be sheets of metal. Bending of such a panel 3—5—3' as a whole would require the extension or compression of the relatively stiff skins or plates 3 and 3'; whereas shear deformation of the composite panel 3—5—3' would require shear of the core material 5 and bending of the thin metal plates. Thus, such a laminated plate 3—5—3' is considerably stiffer in bending than in shear, and one may expect shear waves, rather than bending waves to occur for frequencies greater than a minimum value, which may be adjusted by proper design of the panel, as later explained. The facings or plates 3, 3', indeed, may provide the boundary conditions necessary for the establishment of shear waves. In summary, then, it may be stated that shear waves may occur in thin plates, provided these plates are of a laminated structure, or equivalent construction, which favors shear rather than bending deformations for the frequencies of interest.

The demand that the interior or core material or medium 5 be soft in shear, but incompressible, is somewhat difficult to satisfy. Suitable materials, such as rubber and plastics, are likely to be far too expensive for most applications; and inexpensive materials, such as fibreboard, which are of low shear stiffness, unfortunately possess considerable compressibility. Such compressible cores have two primary disadvantages. First, they tend to reduce the static bending stiffness by permitting the spacing between the facings 3, 3' to change; and secondly, they introduce a double-wall transverse mechanical resonance at an undesirably low frequency, which considerably reduces the sound transmission loss of the panel.

The difficulties associated with compressible cores may be alleviated by increasing the stiffness of these cores in the direction normal to the facing or plate surface. This may be accomplished by using anisotropic core materials, as later discussed in connection with the embodiments of FIGS. 4 and 5, or by adding a number of rigid bridges between the plates in order to increase the frequency of the double wall resonance without increasing the shear stiffness of the core, as later discussed in connection with FIG. 6.

The criteria essential for producing the desired phenomena underlying the invention are several-fold. First, the velocity $c_s$ of the shear wave in the interior medium 5 must not exceed approximately seven-tenths of the velocity $c_0$ of sound in the air or other medium surrounding the panel; preferably not greater than two-thirds. This requires a sufficiently low ratio of shear modulus to density of the interior core medium 5, as loaded by the facings 3, 3', hereinafter termed the interior-medium density, as is evident from Equation 2 above. Curve II of FIG. 3 shows that for such a limitation, where the shear-wave velocity is about half that of the sound velocity in air, the transmission loss differs but little from curve I.

Secondly, the effective longitudinal stiffness of the interior medium 5 in terms of its Young's modulus $E_c$ must be less than the longitudinal stiffness of the inner and outer facing surfaces or plates 3, 3' in terms of their Young's modulus $E_1$, to set up the before-mentioned shear-wave boundary condition.

In order to obtain the further feature of a high critical frequency ($\omega_c = 2\pi f_c$), FIG. 3, at which the panel facing surfaces or plates 3, 3' themselves will radiate (i.e., at which the bending velocity therein becomes comparable to or coincident with the velocity of sound $c_0$ in the surrounding medium), the relationship of Equation 1 may be rewritten as $$\omega_c = c_0^2 (M'/B')^{\frac{1}{2}} > \omega_h \qquad (3)$$

where $M'$ and $B'$ are the facing mass per unit area and bending stiffness, respectively, and where $\omega_h$ is $2\pi$ times the highest frequency $f_h$ of interest in the band of frequencies over which high transmission loss is required.

Lastly, if it is to be insured that the transmission loss is not reduced within the desired band by mechanical double-wall resonance transversely between the inner and outer panel facings, the thickness of the panel therebetween and the parameters of the core 5 must be such as to provide a transverse mechanical resonant frequent $f_0$ outside the said band, also. Thus, in FIG. 3, curve V shows a dip P' in the transmission-loss curve occurring at a frequency $f_0$ outside the five-thousand cycle upper limit of the band of frequencies there of interest.

In FIG. 4, a preferred panel or the like is shown constructed of a pair of planar surfaces 3, 3', as of sheet steel or the like, sandwiching a non-isotropic interior core medium of wood fiber 5'. The wood fibers are built up in a layered or laminar form, not shown, so that the stiffness in planes parallel to the outer core face is, for example, a hundred times or more greater than the stiffness normal thereto. The core may then be glued-together or otherwise secured in such a way that the said planes originally parallel to the surfaces of the fiber are normal, as at 5", shown vertical, to the planes of the plates 3, 3' which are shown horizontal. This arrangement provides low shear stiffness, as applied to waves propagating along the plates 3, 3', and low compressibility in the direction normal to the skins and planes of the plates, 3, 3', for high double-wall resonance.

The results of measurements with such a construction, employing 0.1 cm. thick steel plates, 3, 3', about one meter long, show that the velocity of the transverse waves was nearly constant between 100 and 2000 cycles per second, and of the order of magnitude of one-half of the velocity of sound in air, i.e., well below coincidence.

The previously described built-up core provides low shear stiffness in only one direction, unfortunately, so that a wide panel with the desired properties cannot be constructed so easily as a narrow panel or bar. In order to obtain a wide panel with low shear stiffness in orthogonal directions parallel to the planes of the plates 3, 3', the fiber or other core material 5 or 5' may be periodically kerfed or provided with periodic slots or cavities 2. The cavities 2 are widened at their ends 2', so that sections 4 of the outer surface panels 3, 3' are unsupported. In such a panel, the ratio of bending to shear stiffness is adjusted by proper choice of geometry, as shown. Shear deformation of the panel occurs by bending in substantially parallel planes of the double-wall unsupported sections 4. As long as these sections 4 are of length $h$ small compared to the bending wave length $\lambda$, the panel shear stiffness is independent of frequency, and the panel may be treated as if it were in shear. Thus, one may describe the performance as corresponding to effective shear-wave propagation. The shear stiffness of the structure of FIG. 4 is thus determined by the bending stiffness of the unsupported outer surface or plate sections 4, rather than by the properties of the core material itself. By suitable choice of the dimensions it is possible to make a panel of this type having a dispersion curve which coincides very nearly with that of layered core panel, above described.

Tests performed with a structure similar to that shown in FIG. 4, with steel plates 3, 3' that were 0.1 cm. thick, fiber board core 5' that was 3.8 cm. thick, and cavities 2 that were 0.8 cm. wide along the unsupported sections 4, spaced 2 cm. apart, provided the transmission-loss performance plotted in FIG. 1. This experimental curve is only slightly below theoretical expectations. The dip at about 8000 cycles is due to the double-wall transverse resonance, falling outside the acoustic band of interest.

The forming of periodic cavities 20 in a panel constituted of a pair of similar-material members 30, 30' having bridging supports 22 that are spaced along the panel and the like a distance small compared with the bending wavelengths of interest, is shown in FIG. 6. Again, as in the case of the embodiment of FIG. 4, the bending of the unsupported sections 40' on each side of the bridging supports 22 results in an effective performance simulating a shear wave; and again, the previously outlined criterion relating to the longitudinal stiffness of the interior medium is met since the cavities 20 provide no such stiffness, and the velocity of simulated shear waves must be less than substantially seven-tenths of the velocity of the acoustic energy in the medium external to the panel. For example, a gypsum panel constructed as shown in FIG. 6, may be 5 cm. thick, may have cavities 20 about 10 cm. long and a thickness of the panels 30, 30' at the unsupported regions 40' of about 0.82 cm. The distance between successive cavities 20, measured along the bridging supports 22, may be about 5 cm. If desired, the cavities 20, like the cavities 2 of FIG. 4, may be filled, at least in part, with sand or other preferably granular material of high mass, but low stiffness, thereby to add mass to the panel and the like and increase the transmission loss. The sand or other filler will also provide some damping. The cavities 20 or 2, moreover, may be interconnected to form large cavity spaces or even a single cavity with the bridges 22 serving as column supports.

In FIG. 5, still a further modification is illustrated in which a plaster or similar panel is formed upon apertured laths or frames 21, with comparatively soft periodically disposed walls or partitions 23, as of wood fiber or the like, in the interior, separating adjacent plaster sections 15. The same criteria above discussed will apply, with the outer wall surfaces 13, 13' having a Young's modulus greater than the Young's modulus of the interior 23—15, and with the effective shear wave velocity less than substantially seven-tenths of the velocity of the acoustic energy in the air or other surrounding medium.

Further modifications will occur to those skilled in the art and all such are considered to fall within the spirit and scope of the invention as defined in the appended claims. In the claims, the term "steel-like" is intended to embrace materials which are like steel in the function performed by the designated element in the acoustic panel; for example, materials such as steel, gypsum, or plaster and the like are "steel-like" when they serve as the outer layers of the acoustic panel. Similarly, materials such as wood, gypsum, or plaster and the like are "wood fiber-like" when they serve in the core of the panel.

What is claimed is:

1. An acoustic panel comprising steel-like layers of sheet material spaced apart, blocks of wood fiber-like material of effective longitudinal stiffness in terms of its Young's modulus less than that of said layers disposed between and in contact with said layers, the effective shear modulus $\mu$ of the said blocks and their effective density $\rho$ being related to the velocity $c_s$ of shear waves in the said panel substantially by the equation $$c_s = \sqrt{\mu/\rho}$$

where $c_s$ is no greater than seven-tenths the velocity $c_0$ of acoustic waves in the medium surrounding said panel, said blocks being spaced apart at their junctions with said layers a maximum of ten cm.

2. An acoustic panel for providing high acoustic transmission loss over a predetermined band of acoustic frequencies below a highest frequency $f_h$, comprising steel-like layers of sheet material spaced apart and of thickness substantially less than that of said panel, blocks of wood fiber-like material of effective longitudinal stiffness in terms of its Young's modulus less than that of said layers disposed between and in contact with said layers, the effective shear modulus $\mu$ of the said blocks and their effective density $\rho$ being related to the velocity $c_s$ of shear waves in the said panel substantially by the equation $$c_s = \sqrt{\mu/\rho}$$

where $c_s$ is no greater than seven-tenths the velocity $c_0$ of acoustic waves in the medium surrounding said panel, said blocks being spaced apart at their junctions with said layers a maximum of ten cm., and said layers having a mass per unit area $M'$ and a bending stiffness $B'$ related to said frequency $f_h$ substantially by the relationship $$c_0^2 (M'/B')^{1/2} > 2\pi f_h$$

3. An acoustic panel as claimed in claim 2 and in which the said spacing of the blocks is a fraction of a centimeter.

4. An acoustic panel as claimed in claim 2 and in which the said spacing of the blocks is a few centimeters.

5. An acoustic panel as claimed in claim 2 and in which the said blocks are of greater stiffness in the direction normal to said layers than parallel thereto.

6. An acoustic panel as claimed in claim 2 and in which the space between the said blocks is of greater dimension adjacent said layers than at the region intermediate the thickness of the panel.

7. An acoustic panel as claimed in claim 2 and in which the said blocks are column supports.

8. An acoustic panel as claimed in claim 2 and in which the spaces between said blocks are filled with material of low stiffness and high mass.

9. An acoustic panel as claimed in claim 2 and in which the spaces between said blocks are provided with acoustic damping material.

10. An acoustic panel as claimed in claim 2 and in which the said blocks are composed of laminae stacked to provide greater stiffness in the direction normal to said layers than parallel thereto.

11. An acoustic panel as claimed in claim 2 and in which the said blocks are separated by slots in a core structure.

12. An acoustic panel as claimed in claim 2 and in which the steel-like layers are of sheet metal.

13. An acoustic panel comprising gypsum-like layers of sheet material spaced apart, blocks of gypsum-like material of effective longitudinal stiffness in terms of its Young's modulus less than that of said layers disposed between and in contact with said layers, the effective shear modulus $\mu$ of the said blocks and their effective density $\rho$ being related to the velocity $c_s$ of shear waves in said panel substantially by the equation $$c_s = \sqrt{\mu/\rho}$$

where $c_s$ is no greater than seven-tenths the velocity $c_0$ of acoustic waves in the medium surrounding said panel, said blocks being spaced apart at their junctions with said layers a maximum of ten cm.

14. An acoustic panel having high transmission loss over a predetermined band of acoustic frequencies below a highest acoustic frequency $f_h$, and having high static stiffness, comprising stiff layers of sheet material spaced apart by a readily shearable core having spaced transverse-stiffening bridging members, which extend between said layers and maintain the layer spacing under static loads, said core having an effective shear modulus $\mu$ and an effective density $\rho$ related to the velocity $c_s$ of shear waves in said panel by the equation $$c_s = \sqrt{\mu/\rho}$$

where $c_s$ is no greater than seven-tenths the velocity $c_0$ of acoustic waves in the medium surrounding said panel, said core having an effective longitudinal stiffness in terms of its Young's modulus $E_c$ substantially less than the longitudinal stiffness of said layers in terms of their Young's modulus $E_l$, said layers having a mass per unit area $M'$ and a bending stiffness $B'$ related to the said highest frequency $f_h$ in said band of acoustic frequencies by the relationship $c_0^2(M'/B')^{1/4} > 2\pi f_h$, the spacing $h$ of said bridging members being less than the wavelength $\lambda$ of bending waves in said panel, and the transverse mechanical resonance frequency of said panel lying outside said band of acoustic frequencies.

15. An acoustic panel as claimed in claim 14 and in which said sheet material is gypsum-like material and said bridging members are column supports.

16. An acoustic panel as claimed in claim 15 and in which said column supports comprise wood fiber-like material.

References Cited in the file of this patent

UNITED STATES PATENTS

| | | |
|---|---|---|
| 1,628,090 | Weiss | May 10, 1927 |
| 1,855,161 | Wyman | Apr. 19, 1932 |
| 1,880,153 | Rosenzweig | Sept. 27, 1932 |
| 2,017,071 | Minor | Oct. 15, 1935 |
| 2,101,568 | Woodbury | Dec. 7, 1937 |
| 2,184,482 | Austin | Dec. 26, 1939 |
| 2,198,885 | Price | Apr. 30, 1940 |
| 2,270,902 | Rubissow | Jan. 27, 1942 |
| 2,744,042 | Pace | May 1, 1956 |

FOREIGN PATENTS

| | | |
|---|---|---|
| 533,200 | Italy | Sept. 19, 1955 |
| 754,299 | Great Britain | Aug. 8, 1956 |